US008097762B2

United States Patent
Khachik et al.

(10) Patent No.: US 8,097,762 B2
(45) Date of Patent: Jan. 17, 2012

(54) PROCESS FOR THE PREPARATION OF β- AND α-CRYPTOXANTHIN

(75) Inventors: Frederick Khachik, Rockville, MD (US); Yufa Liu, West Des Moines, IA (US); Holly Showalter, West Des Moines, IA (US)

(73) Assignee: University of Maryland, College Park, College Park, MD (US)

( * ) Notice: Subject to any disclaimer, the term of this patent is extended or adjusted under 35 U.S.C. 154(b) by 0 days.

(21) Appl. No.: 12/834,460

(22) Filed: Jul. 12, 2010

(65) Prior Publication Data

US 2010/0280286 A1     Nov. 4, 2010

Related U.S. Application Data

(62) Division of application No. 10/973,204, filed on Oct. 26, 2004, now abandoned.

(51) Int. Cl.
*C07C 35/18*     (2006.01)
*C07C 35/21*     (2006.01)

(52) U.S. Cl. ......... 568/825; 568/816; 568/338; 568/668

(58) Field of Classification Search .................. None
See application file for complete search history.

(56) References Cited

U.S. PATENT DOCUMENTS
3,949,011 A     4/1976    Smirnov et al.
(Continued)

FOREIGN PATENT DOCUMENTS
GB     1081104 (A)     8/1967
(Continued)

OTHER PUBLICATIONS

Khachik, Frederick, et al., "Isolation, structural elucidation, and partial synthesis of lutein dehydration products in extracts from human plasma," Journal of Chromatography B: Biomedical Applications 670, 1995, pp. 219-233, XP-000943207, Elsevier Science B.V.

(Continued)

*Primary Examiner* — Porfirio Nazario Gonzalez
*Assistant Examiner* — Yate K Cutliff
(74) *Attorney, Agent, or Firm* — Sterne, Kessler, Goldstein & Fox P.L.L.C.

(57) ABSTRACT

The present invention relates to a process for converting lutein and/or lutein esters to (3R)-β-cryptoxanthin and (3R, 6'R)-α-cryptoxanthin, suitable for human consumption as dietary supplements, by employing safe and environmentally friendly reagents. (3R)-β-Cryptoxanthin and (3R,6'R)-α-cryptoxanthin are two rare food carotenoids that are not commercially available and the former exhibits vitamin A activity. In the first synthetic step, commercially available lutein and/or lutein esters are transformed into a mixture of dehydration products of lutein (anhydroluteins) in the presence of a catalytic amount of an acid. The resulting anhydroluteins are then converted to (3R)-β-cryptoxanthin (major product) and (3R, 6'R)-α-cryptoxanthin (minor product) by heterogeneous catalytic hydrogenation employing transition elements of group VIII (Pt, Pd, Rh supported on alumina or carbon) in a variety of organic solvents under atmospheric pressure of hydrogen and at temperatures ranging from −15° C. to 40° C. Among these catalysts, Pt supported on alumina at 40° C. in ethyl acetate provides the best yield of (3R)-β-cryptoxanthin and (3R,6'R)-α-cryptoxanthin. Several homogeneous catalysts can also promote the regioselective hydrogenation of anhydroluteins to a mixture of (3R)-β-cryptoxanthin and (3R, 6'R)-α-cryptoxanthin in low to moderate yields. The catalysts may be transition metal complexes such as palladium acetylacetonate, Rh(Ph$_3$P)$_3$Cl (Wilkinson's catalyst), [(C$_6$H$_{11}$)$_3$P [C$_8$H$_{12}$][C$_5$H$_5$N]Ir$^+$PF6$^-$ (Crabtree catalyst), or [C$_8$H$_{12}$] [(MePh$_2$P)$_2$]Ir$^+$PF6$^-$. Among these, Wilkinson catalyst converts anhydroluteins to (3R)-β-cryptoxanthin and (3R, 6'R)-α-cryptoxanthin in nearly quantitative yield. A novel feature of this invention is the regioselective hydrogenation of anhydroluteins while the highly conjugated polyene chain of these carotenoids remains intact.

13 Claims, 2 Drawing Sheets

U.S. PATENT DOCUMENTS

| | | | |
|---|---|---|---|
| 3,988,205 | A * | 10/1976 | Boguth et al. ............ 435/148 |
| 4,973,717 | A | 11/1990 | Williams |
| 5,382,714 | A | 1/1995 | Khachik |
| 6,262,284 | B1 | 7/2001 | Khachik |
| 6,420,614 | B1 | 7/2002 | Eugster et al. |
| 6,911,564 | B2 | 6/2005 | Khachik |
| 7,115,786 | B2 | 10/2006 | Khachik |
| 2003/0220525 | A1 | 11/2003 | Khachik |
| 2006/0088631 | A1 | 4/2006 | Khachik |

FOREIGN PATENT DOCUMENTS

| | | |
|---|---|---|
| GB | 1508197 (A) | 4/1978 |
| JP | S55-033463 | 3/1980 |
| JP | H08-092205 | 4/1996 |
| JP | 2000136181 A | 5/2000 |
| WO | WO 01/83414 A1 | 11/2001 |
| WO | WO 02/10128 A2 | 2/2002 |
| WO | WO 02/060865 A1 | 8/2002 |
| WO | WO 03/066547 | 8/2003 |
| WO | WO 03/066547 A2 | 8/2003 |

OTHER PUBLICATIONS

Buchecker, R. et al., "Absolute Konfiguration von Xanthophyll (Lutein)," *Helvetica Chimica Acta 57*(3): 631-656, Verlag Helvetica Chimica Acta, Switzerland (1974).

Buchecker, R. et al., CAPLUS Abstract, Accession No. 1974:437671 (1974).

International Search Report for International Application No. PCT/US2004/35798, United States Patent and Trademark Office R/O, United States, mailed on Mar. 17, 2005.

Kursanov, D. N. et al., "Ionic Hydrogenation of the Ethylene Bond and the Double Bond of the Carbonyl Group," *Tetrahedron 23*: 2235-2242, Pergamon Press Ltd., Northern Ireland (1967).

Kursanov, D.N. et al., "Applications of Ionic Hydrogenation to Organic Sythesis," *Sythesis 1974*(09): 633-651, Thieme, Germany (1974).

Nagai, Y., "Hydrosilanes as Reducing Agents. A Review," *Organic Preparations and Procedures Int. 12*(1-2): 13-48, Organic Preparations and Procedures, Inc., United States (1980).

Olah, G. et al., "Ionic Hydrogenation with Triethylsilane-Trifluoroacetic Acid-Ammonium Fluoride or Triethylsilane-Pyridinium Poly(hydroge fluoride)," *Synlett 1992*(08): 647-650, Thieme, Germany (1992).

Zechmeister, L. & Sease, J. W., "Conversion of Lutein in a Boric Acid-Naphthalene Melt. I," *J. Am. Chem. Soc. 65* (10): 1951-1955, American Chemical Society, United States (1943).

Loeber, D.E., et al. "Carotenoids and Related Compounds. Part XXVIII. Synthesis of Zeaxanthin, β-Cryptoxanthin, and Zeinoxanthin (α-Cryptoxanthin)" *J. Chem. Soc.C*: 404-408, Royal Society of Chemistry, UK (1971).

International Preliminary Report on Patentability for International Application No. PCT/US04/35798, IPEA/US, United States, completed on Jan. 19, 2006.

Written Opinion of the International Searching Authority for International Application No. PCT/US04/35798, ISA/US, United States, mailed on Mar. 17, 2005.

English-language translation of Japanese Patent Publication No. 2000-136181, U.S. Appl. No. 10/973,204, filed Oct. 26, 2004.

* cited by examiner

PROCESS FOR THE PREPARATION OF β- AND α-CRYPTOXANTHIN

BACKGROUND OF THE INVENTION

1. Field of Invention

The invention is in the field of organic chemistry. The invention relates to a process that converts a mixture of dehydration products of (3R,3'R,6'R)-lutein, hereto after referred to as anhydroluteins, to a mixture of (3R)-β-cryptoxanthin and (3R,6'R)-α-cryptoxanthin by catalytic hydrogenation with a variety of heterogeneous and homogeneous catalysts under mild conditions at atmospheric pressure. Two alternative processes have also been developed that can convert unesterified lutein to anhydroluteins. The invention also relates to a process that converts other lutein sources to anhydroluteins.

2. Background of the Art

β-Cryptoxanthin, as measured through blood plasma samples, is associated with blood pressure reduction as seen in an Oxford University large intervention trial (John J H, Ziebland S, Yudkin P, Roe L S, Neil H A. Effects of fruit and vegetable consumption on plasma antioxidant concentrations and blood pressure: a randomised controlled trial. *Lancet* 2002; 359(9322):1969-74). Healthy and diseased subjects have been studied in a variety of prospective trials to correlate β-cryptoxanthin levels with cardiovascular parameters (John et al.; Appel L, Moore T, Obarzanek E, et al. A clinical trial of the effects of dietary patterns on blood pressure. *N Engl J Med* 1997; 336(16):1117-24). There seems to be a relationship with cardiovascular markers such as LDL oxidation (Roberts W G, Gordon M H, Walker A F. Effects of enhanced consumption of fruit and vegetables on plasma antioxidant status and oxidative resistance of LDL in smokers supplemented with fish oil. *Eur J Clin Nutr* 2003; 57:1303-10), DNA synthesis (aortic cells) (Carpenter K L, Hardwick S J, Albarani V, Mitchinson M J. Carotenoids inhibit DNA synthesis in human aortic smooth muscle cells. *FEBS Lett* 1999; 447(1): 17-20), malondialdehyde, and myocardial infarction onset. Subjects with either coronary artery disease (CAD), congestive heart failure (CHF), coronary heart disease (CHD), angina pectoris, or myocardial infarction onset have all shown to have lower β-cryptoxanthin levels with respect to healthy age-matched subjects (Meraji S, Abuja P M, Hayn M, et al. Relationship between classic risk factors, plasma antioxidants and indicators of oxidant stress in angina pectoris (AP) in Tehran. *Atherosclerosis* 2000; 150(2):403-12; Morris D, Kritchevsky S, Davis C. Serum carotenoids and coronary heart disease: the Lipid Research Clinics Coronary Primary Prevention Trial and Follow-up Study. *JAMA* 1994; 272:1439-41; Ruiz Rejon F, Martin-Pena G, Granado F, Ruiz-Galiana J, Blanco I, Olmedilla B. Plasma status of retinol, alpha- and gamma-tocopherols, and main carotenoids to first myocardial infarction: case control and follow-up study. *Nutrition* 2002; 18(1):26-31; Dwyer J H, Paul-Labrador M J, Fan J, Shircore A M, Bairey Merz C N, Dwyer K M. Progression of Carotid Intima-Media Thickness and Plasma Antioxidants: The Los Angeles Atherosclerosis Study. *Arterioscler Thromb Vasc Biol* 2004; 24:313-19; Vogel S, Contois J H, Tucker K L, Wilson P W, Schaefer E J, Lammi-Keefe C J. Plasma retinol and plasma and lipoprotein tocopherol and carotenoid concentrations in healthy elderly participants of the Framingham Heart Study. *Am J Clin Nutr* 1997; 66(4): 950-8). Inflammatory markers such as C-reactive protein and fibrinogen have also been linked to low β-cryptoxanthin levels (Kritchevsky S B, Bush A J, Pahor M, Gross M D. Serum carotenoids and markers of inflammation in nonsmokers. *Am J Epidemiol* 2000; 152(11):1065-71). Inflammation and the relationship to heart disease is a relatively new area of study. Currently, there are no products available for the dietary supplement market which have appreciable levels of β-cryptoxanthin in them or contain β-cryptoxanthin as the major ingredient.

There have also been some preliminary studies looking at the effect of beta cryptoxanthin on bone growth and the inhibition of bone reabsorption. In vitro studies have shown a positive effect of β-cryptoxanthin increasing bone calcium and enhancing bone alkaline phosphatase (Yamaguchi, M, Uchiyama, S. Effect of carotenoid on calcium content and alkaline phosphatase activity in rat femoral tissues in vitro: the unique anabolic effect of beta-cryptoxanthin *Biol. Pharm. Bull* 2003; 26(8): 1188-91) (Uchiyama, A, Yamaguchi, M. Inhibitory effect of beta cryptoxanthin on osteoclast-like cell formation in mouse marrow cultures. *Biochem. Pharmacol.* 2004; 67: 1297-13-5). Oral studies in rats have shown similar results. (Uchiyama, S, Sumida, T, Yamaguchi, M. Oral administration of beta-cryptoxanthin induces effects on bone components in the femoral tissues of rats in vivo. *Biol. Pharm. Bull.* 2004; 27(2): 232-5. A PCT was filed on these findings (Yamaguchi, M. Osteogenesis promoter containing β-cryptoxanthin as the active ingredient PCT WO 2004/037236 A1).

This invention is an improvement to the process described in PCT/US2001/23422 (which is incorporated herein by this reference) that converts commercially available (3R,3'R, 6'R)-lutein containing 5% (3R,3'R)-zeaxanthin in two steps to a mixture of (3R)-β-cryptoxanthin and (3R,6'R)-α-cryptoxanthin. In the first step according to PCT/US2001/23422, (3R,3'R,6'R)-lutein is allowed to react with an alcohol, used as solvent, in the presence of catalytic amount of an acid between 45-50° C. to give the corresponding 3'-alkyl ethers of lutein. Water and additional acid is then added to the mixture and the temperature is raised to 78-88° C. to convert the resulting lutein 3'-alkyl ethers to a mixture of anhydroluteins I, II, and III, quantitatively (Scheme 1 of FIG. 1). At the beginning of this transformation, anhydrolutein I is the major product and anhydrolutein II and III are the minor products. As heating continues at 78-88° C., anhydroluteins I and II are partially isomerized to anhydrolutein III within 7-20 h depending on the nature of the alcohol. In the second step of the PCT/US2001/23422, the resulting product, rich in anhydrolutein III is allowed to react with about 1.3 equivalent of a hydride donor and about 3.5-4 equivalent of a strong organic acid in a chlorinated solvent at ambient temperature for about 1-5 hours to give a mixture of E/Z-(3R)-3-cryptoxanthin, E/Z-(3R,6'R)-α-cryptoxanthin, and minor quantities of unreacted anhydroluteins I and II, as well as recovered E/Z-(3R, 3'R)-zeaxanthin.

The present invention provides an alternative route to the second step of PCT/US2001/23422 for making (3R)-β-eryptoxanthin and (3R,6'R)-α-cryptoxanthin from anhydroluteins and eliminates the use of chlorinated solvents and reagents such as trifluoroacetic acid, and borane-amine complex. This is accomplished by heterogeneous or homogeneous catalytic hydrogenation of anhydroluteins according to the scheme illustrated in FIG. 1.

In addition, the present invention improves the first step of transformation of (3R,3'R,6'R)-lutein to anhydroluteins to reduce the amounts of solvents used as well as increasing the purity and stability of the products.

While in all of the above processes, unesterified lutein has been employed as the starting material, the present invention has further developed two alternative processes that can employ a mixture of esterified luteins as the starting material to prepare anhydroluteins that can then be transformed to (3R)-β-cryptoxanthin and (3R,6'R)-α-cryptoxanthin by catalytic hydrogenation.

SUMMARY OF THE INVENTION

In an attempt to eliminate the use of chlorinated solvents and reagents that may be toxic to humans, an alternative process for the second step of the partial synthesis of (3R)-β-cryptoxanthin and (3R,6'R)-α-cryptoxanthin from anhydroluteins has been developed. This has been accomplished by heterogeneous or homogeneous catalytic hydrogenation of anhydroluteins. Catalytic hydrogenation has been extensively used in pharmaceutical and food industries and offers an economical route to products that can be safely used by humans. There are numerous literature examples that deal with heterogeneous and homogeneous hydrogenation of cycloalkenes and cyclodienes (H. Takaya, R. Noyori in Comprehensive Organic Synthesis, Eds. B. M. Trost and I. Fleming, Pergamon, Oxford, 1991, Vol 8, pp 417-470). However, to date, there are no literature reports on regioselective catalytic hydrogenation of carotenoids. This is primarily due to the presence of a highly conjugated polyene chain in carotenoids that makes these compounds readily susceptible to hydrogenation and as a result the regioselectivity of this process is difficult to control. Nonetheless, the present invention will demonstrate that under carefully controlled conditions, heterogeneous and homogeneous catalytic hydrogenation of anhydroluteins with a wide range of catalysts in various solvents can yield a mixture of (3R)-β-cryptoxanthin and (3R,6'R)-α-cryptoxanthin in moderate to excellent selectivity and yields.

Therefore, in an alternative embodiment, the present invention converts anhydroluteins rich in anhydrolutein III to a mixture of (3R)-β-cryptoxanthin and (3R,6'R)-α-cryptoxanthin by heterogeneous catalytic hydrogenation employing transition elements group VIII such as platinum, palladium, or rhodium supported on carbon or alumina at temperatures ranging from −15° C. to 40° C. in a variety of organic solvents. Among these catalysts, platinum supported on alumina provides the best yield of (3R)-O-cryptoxanthin and (3R,6'R)-α-cryptoxanthin.

Similarly, the present invention demonstrates that several homogeneous catalysts can also promote the regioselective catalytic hydrogenation of anhydroluteins to yield a mixture of (3R)-β-cryptoxanthin and (3R,6'R)-α-cryptoxanthin in moderate yields. However, depending on the nature of the catalyst and the reaction conditions, approximately 30-82% of the anhydroluteins remain unreacted. The homogeneous catalysts may be transition metal complexes such as palladium acetylacetonate, tris(triphenylphosphine)rhodium (I) chloride [Rh(Ph$_3$P)$_3$Cl] (Wilkinson's catalyst), (tricyclohexylphosphine)(1,5-cyclooctadiene)pyridine Iridium (I) hexafluorophosphate [(C$_6$H$_{11}$)$_3$P[C$_8$H$_{12}$][C$_5$H$_5$N]Ir$^+$PF6$^-$ (Crabtree catalyst), and (1,5-cyclooctadiene)bis(methyldiphenylphosphine) Iridium (I) hexafluorophosphate [C$_8$H$_{12}$][(MePh$_2$P)$_2$]Ir$^+$PF6$^-$. Among these, hydrogenation of anhydroluteins with calculated amounts of Wilkinson's catalyst yields (3R)-cryptoxanthin and (3R,6'R)-α-cryptoxanthin in almost quantitative yield. Various formulations of commercially available lutein that are employed as the starting material in this invention, also contain approximately 5-9% (3R,3'R)-zeaxanthin. This carotenoid remains unreacted throughout the reaction sequences described above and is recovered as a minor constituent in the final products.

Figure 2:
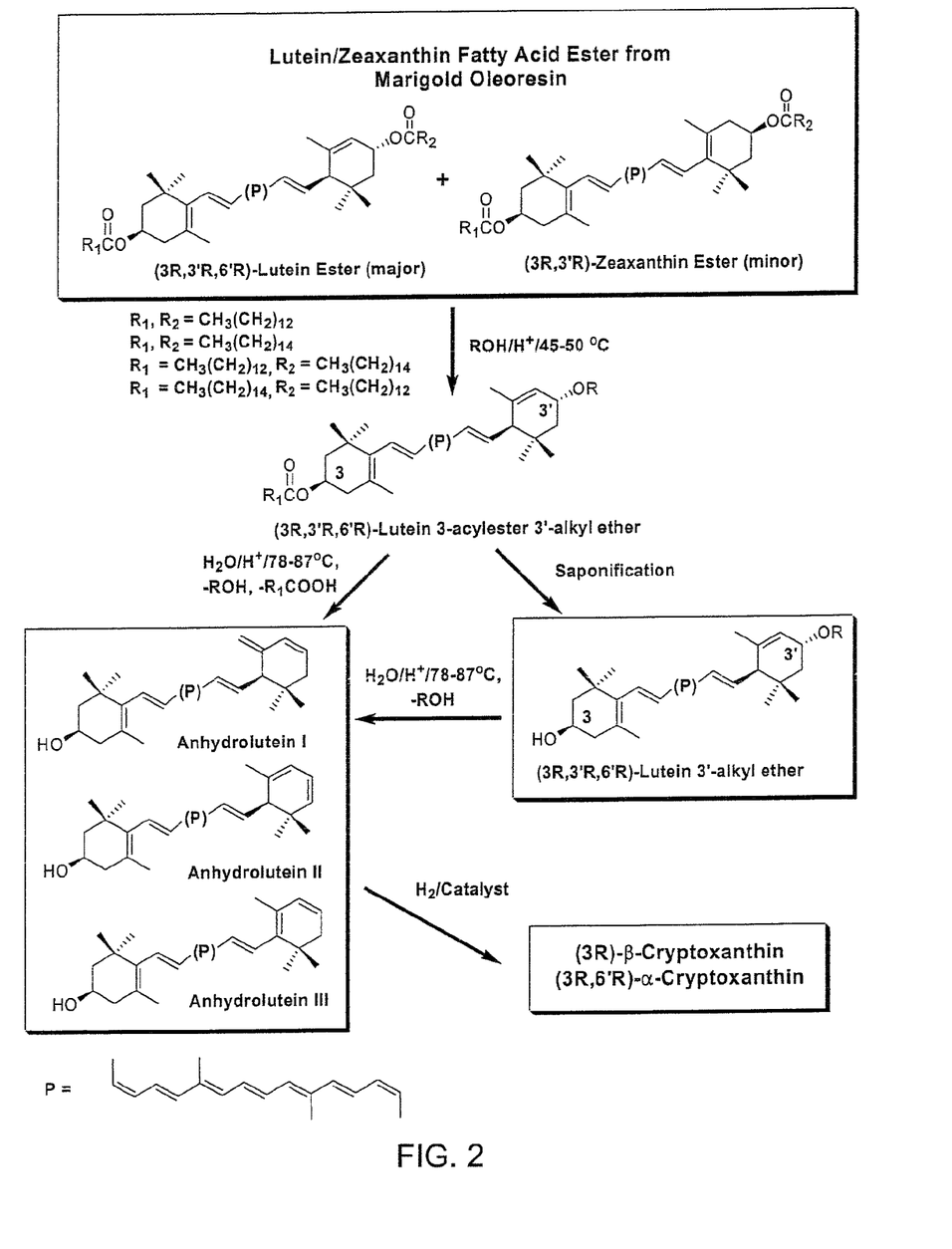
FIG. 2 is a scheme which depicts the conversion of lutein esters to β-cryptoxanthin and α-cryptoxanthin via anhydroluteins I-III prepared by acid-catalyzed transesterification; (3R,3'R)-zeaxanthin esters that are present as minor constituents in the starting material are converted to unesterified (3R,3'R)-zeaxanthin but otherwise remain unchanged throughout the entire process.

The above processes employ unesterified lutein from saponified extracts of marigold oleoresin as the starting material. However, the present invention also provides two alternative routes to anhydroluteins from unsaponified extracts of marigold oleoresin that contains lutein fatty acid esters (e.g. lutein bispalmitate, lutein bismyristate, lutein 3-myristate 3'-palmitate, lutein 3-palmitate 3'-myristate), as shown in the scheme of FIG. 2. Lutein esters in marigold oleoresin are also accompanied by approx. 5-9% of zeaxanthin fatty acid esters (e.g. zeaxanthin bismyristate, zeaxanthin 3-myristate 3'-palmitate, zeaxanthin bispalmitate). The preparation of anhydroluteins from unsaponified extracts of marigold oleoresin is accomplished by acid-catalyzed transesterification of lutein esters with an alcohol at an elevated temperature, preferably between about 45 to 50° C. Under these controlled conditions, the acylester at the 3'-position in lutein esters preferentially undergoes transesterification while the acylester group at the 3-position remains unchanged. In the presence of an alcohol and catalytic amount of an acid, the transesterification is also accompanied by etherification at the 3'-position (see the scheme of FIG. 2). The resulting lutein 3-acylester 3'-alkyl ether can then be converted to anhydroluteins at elevated temperature, preferably ranging from about 78 to 88° C. Alternatively, lutein 3-acyl ester 3'-alkyl ether can be subjected to saponification to hydrolyze the acyl ester at the 3-position and yield lutein 3'-alkyl ether; the latter can then be converted to anhydroluteins according to the PCT/US2001/23422. Catalytic hydrogenation of the resulting anhydroluteins according to the processes of the present invention can yield a mixture of (3R)-β-cryptoxanthin and (3R,6'R)-α-cryptoxanthin. (3R,3'R)-Zeaxanthin esters that are present as minor constituents in the starting material are converted to unesterified (3R,3'R)-zeaxanthin but otherwise remain unchanged throughout the entire process.

The present invention also improves the process that converts lutein to anhydroluteins by reducing the volume of solvents and increasing the purity and stability of the products. In addition to the use of dry lutein powder as the starting material, the present invention further demonstrates that lutein-containing products with considerable amounts of water content, hereinafter referred to as wet lutein, can be employed to convert this carotenoid to anhydroluteins in excellent yields. Wet lutein, as used in this disclosure includes any lutein-containing product that includes more water than dry lutein-powder. Specifically included in the term wet lutein is the product produced as described in U.S. Pat. No. 5,648,564 at the point where water has been added to the saponified oleoresin and some of the liquid removed by centrifugation. Kemin Industries (Des Moines, Iowa) sells Oro-GLO® Liquid products that are also included in the term wet lutein.

(3R)-β-Cryptoxanthin and (3R,6'R)-α-cryptoxanthin can be used as dietary supplements, nutritional ingredients, or as a food coloring additives. The commercial availability of these carotenoids allows scientists to investigate the potential chemopreventive efficacy of these compounds as neuroprotectors and in the promotion of bone health as well as in the prevention of cancer, cardiovascular disease, and macular degeneration.

DETAILED DESCRIPTION OF PREFERRED EMBODIMENTS

Figure 1:
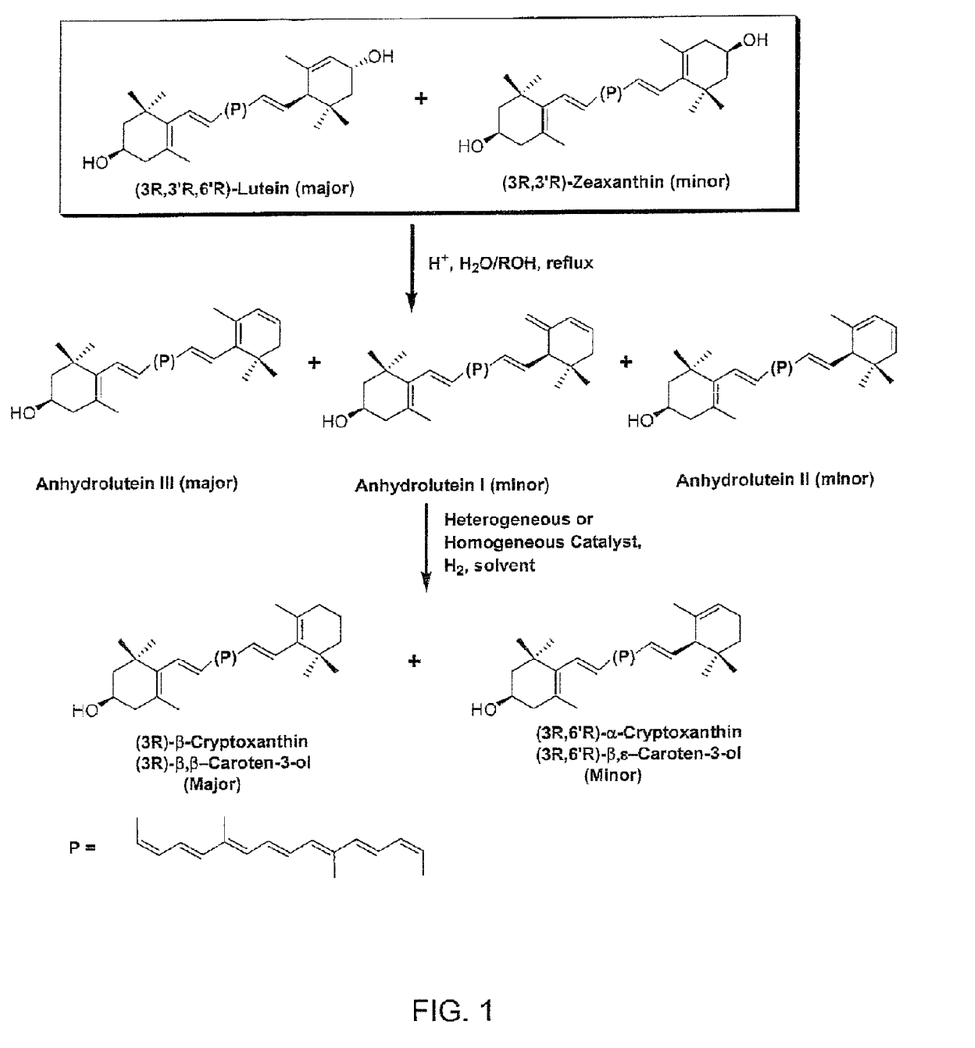
FIG. 1 is a scheme which depicts the conversion of (3R,3'R,6'R)-lutein to β-cryptoxanthin and α-cryptoxanthin; (3R,3'R)-zeaxanthin which is present in the starting material remains unreacted throughout the entire process and is recovered in the final product.

According to earlier application PCT/US2001/23422, commercially available (3R,3'R,6'R)-lutein containing approximately 5% (3R,3'R)-zeaxanthin can be dehydrated with a strong mineral acid at 50-60° C. to yield anhydrolutein I as the major product and anhydroluteins II and III as the minor products. However as the temperature is elevated to 78-88° C., anhydrolutein I slowly isomerizes to anhydrolutein III; the latter is the preferred starting material for the second step of the fore-mentioned process (PCT/US2001/23422). Therefore the resulting product of this isomerization is a mixture of anhydroluteins in which anhydrolutein III is the major product and the rest is anhydrolutein I and anhydrolutein II as well as minor quantities of unreacted zeaxanthin (FIG. 1). In the second step of PCT/US2001/23422, this mixture is subjected to ionic hydrogenation with a strong acid and a hydride ion donor at ambient temperature to yield (3R)-β-cryptoxanthin and (3R,6'R)-α-cryptoxanthin in excellent yields.

The present invention relates to a catalytic hydrogenation process that converts a mixture of anhyroluteins which consists of approximate ratios of anhydrolutein I: anhydrolutein II: anhydrolutein III (1.4:1.0:10) to a mixture of β-cryptoxanthin and α-cryptoxanthin by heterogeneous and homogeneous catalytic hydrogenation in a variety of solvents under mild conditions at atmospheric or elevated pressure (FIG. 1). The heterogeneous catalyst may be selected from the transition elements of group VIII such as platinum (Pt) supported on alumina (5%), Pt supported on activated carbon (5% or 10%), palladium (Pd) supported on activated carbon (Pd/C, 5% or 10%), Pd supported on alumina (5% or 10%), Pd supported on calcium carbonate (Pd/CaCO$_3$, 5%), Pd 3% on polyethyleneimine/SiO$_2$ (Royer Pd catalyst), or rhodium (Rh) supported on alumina (5%). Among these, the best results are obtained with Pt supported on alumina that transforms a mixture of anhydroluteins to β-cryptoxanthin and α-cryptoxanthin in yields ranging from 77-99% of total carotenoids.

The homogeneous catalyst may be transition metal complexes such as palladium acetylacetonate, tris(triphenylphosphine)rhodium (I) chloride [Rh(Ph$_3$P)$_3$Cl] (Wilkinson's catalyst), (tricyclohexylphosphine)(1,5-cyclooctadiene)pyridine Iridium (I) hexafluorophosphate [(C$_6$H$_{11}$)$_3$P[C$_8$H$_{12}$][C$_5$H$_5$N]Ir$^+$PF6$^-$ (Crabtree catalyst), and (1,5-cyclooctadiene)bis(methyldiphenylphosphine) Iridium (I) hexafluorophosphate [C$_8$H$_{12}$][(MePh$_2$P)$_2$]Ir$^+$PF6$^-$.

All of the heterogeneous and homogeneous hydrogenation reactions are preferentially carried out under an atmospheric pressure of hydrogen. However, heterogeneous catalytic hydrogenation reactions conducted with Pt under hydrogen pressures of 40-60 psi produce similar results to those carried out at atmospheric pressure. The heterogeneous catalytic hydrogenation of anhydroluteins can be carried out with 1.4-5.0 mol % (0.5-1.8 weight %) of the catalyst to substrate to give moderate to excellent yields of (3R)-β-cryptoxanthin and (3R,6'R)-α-cryptoxanthin. The homogeneous catalytic hydrogenation reactions require 3-10 mol % of catalyst to substrate to produce a low to moderate yield of the desired products. This is with the exception of the Wilkinson's catalyst [Rh(Ph$_3$P)$_3$Cl] converts anhydroluteins to (3R)-β-cryptoxanthin and (3R,6'R)-α-cryptoxanthin in almost quantitative yields. Depending on the nature of the catalyst and solvent, the temperature, pressure and duration of the reaction may vary. A wide range of solvents in which anhydroluteins are soluble, can be employed with this catalytic hydrogenation; these include but are not limited to: ethyl acetate, acetone, tetrahydrofuran (THF), tert-butyl methyl ether (TBME), toluene, and chlorinated solvents (dichloromethane, chloroform, 1,2-dichloroethane). The range of temperature for the heterogeneous catalytic hydrogenation with transition elements of group VIII is between −15 to 100° C. and preferably between about −15 to about 40° C. However with Pd 3% on polyethyleneimine/SiO$_2$ (Royer Pd catalyst), the reaction is preferably carried out at temperatures ranging from about 20 to 80° C. and most preferably between about 45 to about 50° C. Homogeneous catalytic hydrogenations can be carried out over a wide range of temperatures, and are commonly carried out at ambient temperature with the exception of reactions carried out with palladium acetylacetonate that are preferably carried out at between about 45 to 50° C.

The starting material, comprising of a mixture of anhydrolutein I, II, and III, may be prepared from commercially available (3R,3'R,6'R)-lutein by modification of the process described in earlier filed application PCT/US2001/23422. The modification involves the use of an ether (including, but not limited to, THF, tert-butyl methyl ether, ethyl ether, diisopropyl ether) as a co-solvent to enhance the solubility of lutein and reduce the volume of alcohol. Suitable alcohols include, but are not limited to, ethanol, 1-propanol, 2-propanol, 1-butanol, 2-butanol, isobutyl alcohol, tert-butyl alcohol, 1-pentanol (n-amyl alcohol), 2-pentanol, n-hexyl alcohol, n-octyl alcohol, ethylene glycol, and propylene glycol. Of course, if the cryptoxanthin prepared by the processes described in this specification are intended for human consumption, the use and selection of an ether and alcohol or mixture of alcohols will be affected by food safety and regulatory concerns and an advantage of the processes described herein is the elimination of chlorinated and toxic solvents.

In an alternative embodiment, the present invention demonstrates that the dehydration of lutein can also be carried out with wet lutein as opposed to dried lutein powder. This alternative process eliminates the use of a co-solvent and, at the same time, reduces the volume of the alcohol employed in the dehydration of lutein. Wet lutein contains substantial amounts of water with approximately 38% lutein content and is produced in the process described in U.S. Pat. No. 5,648,564, which is incorporated herein by this reference; in a subsequent step, the wet lutein is dried to produce dried lutein powder. In addition, anhydroluteins prepared by acid-catalyzed dehydration of wet or dried lutein with hydrochloric acid have been found to be more stable as opposed to products obtained with other mineral acids such as sulfuric and phosphoric acids. Organic acids, such as trifluoroacetic acid and trichloroacetic acid, can also be used. At the end of the dehydration reaction, a sufficient amount of a mineral base such as sodium or potassium hydroxide is added to neutralize the acid used in the dehydration reaction and the pH is adjusted to 7. The addition of the mineral base may contribute to an increase in the stability of the anhydroluteins upon storage.

In an alternative embodiment, the present invention further demonstrates that anhydroluteins, which are the precursors to β-cryptoxanthin and α-cryptoxanthin, can be directly prepared from esterified lutein by acid-catalyzed transesterification (FIG. 2). Lutein esterified with fatty acids such as myristic and palmitic are abundant in certain natural products, particularly in the crude extracts of marigold flowers, and can serve as an economically viable raw material for the synthesis of anhydroluteins.

Reagents and Starting Materials

Four types of (3R,3'R,6'R)-lutein may be employed as starting materials in this invention, these are: 1) commercially available dried (3R,3'R,6'R)-lutein powder; 2) a purified product of lutein powder with greater than 97% total carotenoid content which is obtained by recrystallization of lutein powder; 3) wet lutein containing water with some not insignificant lutein content; and 4) marigold oleoresin containing a mixture of lutein fatty acid esters, examples of which include lutein bismyristate, lutein bispalmitate, lutein β-myristate 3' palmitate, and lutein β-palmitate 3' myristate. Marigold oleoresin is prepared from extracts of marigold flowers and typically contains approximately 3% (wt/wt) of lutein after saponification dependent, of course, on the lutein content of the marigold flowers. Saponified marigold oleoresin is also the precursor of a wet lutein product that is used to prepare lutein powder. Saponified marigold oleoresin contains (3R,3'R)-zeaxanthin which remains unreacted throughout all of the processes described in the present invention. Depending on the source of marigolds, saponified marigold oleoresin contains between approximately 5 and 9% of (3R, 3'R)-zeaxanthin relative to (3R,3'R, 6'R)-lutein (91-95%). The reactions described in the present invention can be carried out with any combinations of these four types of lutein. All of these starting materials can be obtained from Kemin Foods (Des Moines, Iowa). All other reagents, solvents, and hydrogenation catalysts used in this invention are commercially available and are used without further purification.

1. Process for Preparation of Anhydroluteins by Acid-Catalyzed Dehydration of (3R,3'R,6'R)-Lutein Powder and Wet Lutein In a typical experiment, dry lutein powder (6.0 g of 85% total carotenoids containing approximately 95% lutein and 5% zeaxanthin by HPLC; approx. 5.10 g, 8.98 mmol) in n-propanol (100 ml) and an ether such as tetrahydrofuran (THF, 10 ml) is treated with 1 ml of 10% hydrochloric acid in n-propanol (v/v) and the mixture is heated to 45-50° under an atmosphere of nitrogen for 30 min to yield lutein 3'-propyl ether. Water (100 ml) and 8 ml of aqueous HCl (18-19%) is added and the temperature of the reaction mixture is raised to 78-88° C. After 12-17 h reflux in n-propanol, the product is allowed to cool down to ambient temperature and 20 ml of 10% solution of sodium hydroxide (wt/v) is added. The reddish crystals of anhydroluteins rich in anhydrolutein III are then removed by filtration. The solids are washed with 40 ml of a 1/1 solution of ethanol/water (v/v) followed by 30 ml of ethanol and 10 ml of hexanes and dried under high vacuum to give 4.5 g of product. The yield of this reaction based on total carotenoid content of the dried product from various experiments ranges from 65% to 75%; the final product consists in excess of 80% anhydrolutein III and the remainder is anhydroluteins I and II as well as minor quantities of (3R,3'R)-zeaxanthin. As shown by HPLC, no significant amount of Z(cis)-isomers of anhydroluteins are present in the crystallized products.

In an alternative embodiment, a suspension of 40 g of wet lutein (38% lutein content) in n-propanol (100 ml), water (50 ml), and aqueous HCl (10 ml, 6 N) is mechanically stirred at reflux temperature (88-90° C.) under an atmosphere of nitrogen for nearly 16 h. After cooling to room temperature, the acid is neutralized and the red crystals are collected by filtration and washed with water and an alcohol. The dried product (13.7 g, total carotenoids) consists of anhydroluteins in a ratio of anhydrolutein I: anhydroluteins anhydrolutein III (1.9:1.0: 10.9) as well as minor quantities of (3R,3'R)-zeaxanthin.

Therefore the invention relates to a modified process of reacting dried lutein or wet powder with an alcohol in the presence of catalytic amount of an acid at above ambient temperature, preferably at 78-88° C., to obtain a mixture of anhydroluteins rich in anhydrolutein III.

Alternatively, the invention relates to a modified process in which a small volume (1-1.7 ml/g of lutein) of an ether (THF, diethyl ether, diisopropyl ether, tert-butyl methyl ether) is used as a co-solvent to increase the solubility of (3R,3'R,6'R)-lutein and allow the reaction to proceed with a small volume of an alcohol (15-17 ml/g of lutein).

Alternatively, the crystalline product is worked up and washed to give a mixture of anhydroluteins. In a preferred embodiment, the work-up and washing of the product comprises washing the crystalline product with a small volume of a hydrocarbon solvent (pentane, hexane, petroleum ether) to remove the unsaturated hydrocarbons that may be present as by-products as well as facilitating the removal, of alcohol and drying of the final products.

2. Preparation of Anhydroluteins by Acid-Catalyzed Transesterification of Lutein Esters from Marigold Oleoresin As shown in the scheme of FIG. 2, lutein esters undergo acid-catalyzed transesterification in the presence of an alcohol at elevated temperature to yield a mixture of anhydroluteins I, II, and III. The present invention demonstrates that the ester groups at C-3 and C-3' positions in lutein are not equally susceptible to transesterification. For example, lutein esters (esterified with myristic and palmitic acids) dissolved in a hydrocarbon solvent or an ether undergo transesterification in n-propanol in the presence of catalytic amount of a mineral acid under controlled conditions at 45-50° C. to yield mainly lutein 3-myristate 3'-propyl ether and lutein 3-palmitate 3'-propyl ether in about 21 h. This has been confirmed by monitoring by HPLC the formation of the products before and after saponification. Prior to saponification, HPLC clearly shows the absence of lutein, lutein 3'-propyl ether, and/or anhydroluteins while saponification of the product yields exclusively lutein 3'-propyl ether. The ease with which the 4-unsaturated ester group at C-3° in lutein esters undergoes transesterification is most likely due to its allylic nature as opposed to the ester group at C-3 which is not allylic and remains unchanged. Therefore under controlled conditions at ambient or elevated temperatures below 50° C., the transesterification of lutein esters results in the formation of lutein 3-acylester which in the presence of catalytic amount of an acid and n-propanol undergoes etherification at C-3' to form lutein 3-acylester 3'-propyl ether. As the temperature is elevated above 50° C., the ester group at C-3 also undergoes acid-catalyzed transesterification to yield luteir. 3'-propyl ether. At temperatures above 50° C., transesterification is also accompanied by the loss of n-propanol from lutein 3'-propyl ether and yields a mixture of anhydroluteins I, II, and III. Alternatively, the present invention isolates lutein 3-acylester 3'-propyl ether and subjects this product to saponification to prepare lutein 3'-propyl ether; the latter is then converted to anhydroluteins according to the procedure described in PCT/US2001/23422.

Therefore the present invention relates to a method of reacting lutein esters dissolved in a hydrocarbon or an ether with catalytic amount of an acid in the presence of an alcohol to obtain a mixture of anhydroluteins, comprising reacting lutein esters with an alcohol in the presence of catalytic amount of an acid at ambient or elevated temperatures below 60° C., preferably between 45-60° C., to obtain a mixture of lutein 3-acylester 3'-alkyl ether, adding water and additional acid and raising the temperature to preferably between 78-88° C. to convert the fore-mentioned mixture to anhydroluteins I, II, and III. In a preferred embodiment, the reaction comprises:

a) dissolving commercially available lutein esters containing minor amounts of zeaxanthin esters from marigold oleoresin in an appropriate volume (about 2 ml/g of marigold oleoresin) of a hydrocarbon solvent (e.g. pentane, hexane, petroleum ether) or an ether (e.g. THF, diethyl ether, diisopropyl ether, tert-butyl methyl ether), adding an alcohol (1.2 ml/g of marigold oleoresin) and catalytic amount of an acid in alcohol [e.g. about 0.1 ml of 10% hydrochloric acid in alcohol (v/v) per g of marigold oleoresin] to obtain a mixture;

b) stifling the mixture between ambient and 60° C., preferably at 60° C., for about 6-8 hours to obtain a mixture of lutein 3-myristate 3'-alkyl ether, lutein 3-palmitate 3'-alkyl ether as well as myristic and palmitic esters of anhydroluteins I, II, and III;

c) adding water (e.g. about 1.2 ml/g of marigold oleoresin) and aqueous acid [e.g. about 0.1 ml of 10% aqueous hydrochloric acid (v/v) per g of marigold oleoresin] and heating the mixture for 22 h between 78-90° C. to obtain anhydroluteins I, II, and III;

d) cooling down the product to ambient temperature and washing the product with water and removing the organic phase;

e) hydrolyzing the organic phase with an alcoholic solution of a mineral base (e.g. KOH/methanol, NaOH/methanol) for 2-3 hours at ambient temperature;

f) washing the organic phase with water and evaporating most of the solvent to obtain a concentrated residue;

g) crystallizing anhydroluteins I-III and minor quantities of zeaxanthin from the residue by adding a 1/1 solution (v/v) of an alcohol in water, preferably, methanol or ethanol in water, collecting the crystals by filtration, and drying the products under high vacuum.

In an alternative embodiment, lutein esters are converted to a mixture of lutein 3-myristate 3'-alkyl ether and lutein 3-palmitate 3'-alkyl ether under controlled conditions and the isolated products are then subjected to alkaline hydrolysis to yield lutein 3'-alkyl ether; this is further converted to anhydroluteins at temperatures between 78-90° C. In a preferred embodiment, the reactions comprise:

a) dissolving commercially available lutein esters containing minor amounts of zeaxanthin esters from marigold oleoresin in an appropriate volume (about 2 ml/g of marigold oleoresin) of a hydrocarbon solvent (e.g. pentane, hexane, petroleum ether) or an ether (e.g. THF, diethyl ether, diisopropyl ether, tert-butyl methyl ether), adding an alcohol (1.2 ml/g of marigold oleoresin) and catalytic amount of an acid in alcohol [e.g. about 0.1 ml of 10% hydrochloric acid in alcohol (v/v) per g of marigold oleoresin] to obtain a mixture;

b) stirring the mixture between ambient to 50° C., preferably between 45-50° C., for about 21 hours to obtain a mixture of lutein 3-myristate 3'-alkyl ether and lutein 3-palmitate 3'-alkyl ether;

c) cooling down the product to ambient temperature and hydrolyzing the mixture with an alcoholic solution of a mineral base (e.g. KOH/methanol, NaOH/methanol) for 2-3 hours at ambient temperature;

d) washing the saponified products with water and evaporating most of the solvent to obtain a concentrated residue;

e) crystallizing lutein 3'-alkyl ether and minor quantities of zeaxanthin from the residue by adding a 1/1 solution (v/v) of an alcohol in water, preferably, methanol or ethanol in water and collecting the crystals by filtration;

f) suspending the crystalline lutein 3'-alkyl ether in an appropriate volume (about 3 ml) of an alcohol and water (about 3 ml), and adding a catalytic amount of an aqueous acid (e.g. about 0.2 ml of 18-19% hydrochloric acid (v/v)) to obtain a mixture;

g) stirring the mixture between 78-90° C. for about 18 hours to obtain a mixture of anhydroluteins I, II, and III;

h) cooling down the product to ambient temperature, neutralizing the acid with a mineral base, and extracting the product with an ether (e.g. ethyl ether, diisopropyl ether, tert-butyl methyl ether);

i) washing the organic phase with water and evaporating most of the solvent to obtain a concentrated residue;

j) crystallizing anhydroluteins I-III and minor quantities of zeaxanthin from the residue by adding a 1/1 solution (v/v) of an alcohol in water, preferably, methanol or ethanol in water, collecting the crystals by filtration and drying the products under high vacuum.

3. Heterogeneous Catalytic Hydrogenation of Anhydroluteins with Transition Elements of Group VIII The invention relates to a process for hydrogenating a mixture of anhydroluteins to 13-cryptoxanthin and α-cryptoxanthin in the presence of catalytic amount of transition elements of group VIII in a variety of organic solvents at temperatures ranging from −15° C. to 40° C. under atmospheric pressure of hydrogen (FIG. 1). The catalysts may be platinum (Pt) supported on alumina (5%), Pt supported on activated carbon (5% or 10%), palladium (Pd) supported on activated carbon (Pd/C, 5% or 10%), Pd supported on alumina (5% or 10%), Pd supported on calcium carbonate (Pd/CaCO$_3$, 5%), Pd 3% supported on polyethyleneimine/SiO$_2$ (Royer Pd catalyst), or rhodium (Rh) supported on alumina (5%). The results of hydrogenation experiments with these catalysts are summarized in Tables 1, 2 and 3. The best yields and regioselectivity for hydrogenation of anhydroluteins to β-cryptoxanthin and α-cryptoxanthin were obtained with Pt (5%) supported on alumina in ethyl acetate. The reaction conditions such as temperature and the amount of catalyst that is employed play an important role on the rate and duration of hydrogenation. With 1.8 weight % (5 mol %) of catalyst (Pt/alumina) to substrate, the reaction proceeds even at −15° C. but at a much slower rate and it requires an overnight nm. Employing the same mol % of catalyst to substrate (5%), the reaction can be completed within 4 h at 0° C. and 2 h at ambient temperature. However, as the mol % of catalyst to substrate is reduced from 5 mol % to 1.4-2.2 mol %, the rate of hydrogenation is diminished and the reaction is best carried out at 40° C. and goes to completion within 10-26 h. The nature of the solvent does not seem to affect the outcome of hydrogenation. In the present invention, ethyl acetate was selected as the solvent of choice due to its safety features and its widely accepted use in preparation of food additives and dietary supplements. The results listed in Table 1 also indicate that the hydrogenation conditions have little or no impact on the overall yield of the reaction. With the exception of the reaction carried out in acetone, the overall yield of hydrogenation of anhydroluteins is in the range of 85-99%. The purity of the anhydroluteins that can range from 45% to 75% also has no impact on the yield or the outcome of the hydrogenation (Table 1). The hydrogenation of a mixture of anhydroluteins with Pt/alumina in ethyl acetate also results in a greater yield of β-cryptoxanthin relative to α-cryptoxanthin. In view of the vitamin A activity of β-cryptoxanthin, this is an important feature of the present invention.

TABLE 1

Hydrogenation of anhydroluteins with platinum (5%) on alumina at atmospheric pressure of hydrogen in various solvents.

| Mixture of Anhydroluteins I + II + III | Catalyst/Support Pt (5%) on alumina | Solvent | Temp. °C., Time (h) | β-Cryptoxanthin:α-Cryptoxanthin Yield (%) of Total Carotenoids* |
|---|---|---|---|---|
| Purity = 75% 0.3 g, 0.225 g, 0.41 mmol | 80 mg (4 mg, 0.02 mmol) 5 mol % ≈ 1.8 Wt % | EtOAc 20 ml | −5 to 0° C., 4 h | β:α = 3:1 Yield (%) = 89 |
| Purity = 75% 0.3 g, 0.225 g, 0.41 mmol | 80 mg (4 mg, 0.02 mmol) 5 mol % ≈ 1.8 Wt % | EtOAc 20 ml | −15° C., 24 h | β:α = 7:3 Yield (%) = 90 |
| Purity = 75% 0.3 g, 0.225 g, 0.41 mmol | 80 mg (4 mg, 0.02 mmol) 5 mol % ≈ 1.8 Wt % | EtOAc 15 ml | Ambient, 2 h | β:α = 2:1 Yield (%) = 88 |
| Purity = 75% 0.3 g, 0.225 g, 0.41 mmol | 80 mg (4 mg, 0.02 mmol) 5 mol % ≈ 1.8 Wt % | Acetone 15 ml | −5 to 0° C., 4 h Ambient, 2 h | β:α = 1.7:1 Yield (%) = 70 |
| Purity = 75% 0.3 g, 0.225 g, 0.41 mmol | 80 mg (4 mg, 0.02 mmol) 5 mol % ≈ 1.8 Wt % | THF 10 ml | −5 to 0° C., 4 h | β:α = 2.1:1 Yield (%) = 86 |
| Purity = 75% 0.3 g, 0.225 g, 0.41 mmol | 80 mg (4 mg, 0.02 mmol) 5 mol % ≈ 1.8 Wt % | THF \10 ml | −15° C., 24 h | β:α = 1.7:1 Yield (%) = 90% |
| Purity = 75% 0.3 g, 0.225 g, 0.41 mmol | 80 mg (4 mg, 0.02 mmol) 5 mol % ≈ 1.8 Wt % | $CH_2Cl_2$ 10 ml | −5 to 0° C., 4 h | β:α = 2.4:1 Yield (%) = 85% |

*Yield (%) of total carotenoids refers to the crude mixture of α-cryptoxanthin and β-cryptoxanthin that contains minor quantities of anhydroluteins I and II and (3R,3'R)-zeaxanthin. The carotenoid concentration of this mixture is measured by HPLC as well as UV-visible spectrophotometry using an average extinction coefficient (E1%) of 2511 in hexane.

Large-scale hydrogenation of anhydroluteins with Pt (5%) on alumina were also shown to be consistent and gave a high yield of cryptoxanthins as the major products in which the ratio of β-cryptoxanthin to α-cryptoxanthin ranged from 5:1 to 3:1. The results of these experiments are summarized in the first three data rows of Table 2. An even larger scale experiment was conducted. A Pfaudler reactor is charged with a mixture of anhydroluteins (400 g, 47.7% total carotenoids, 31.5% anhydrolutein III), platinum (5%) supported on alumina (40 g,), and ethyl acetate (14 liter). The reaction system is purged by nitrogen, followed by hydrogen. The mixture is stirred at 40° C. and 40 PSI of hydrogen. After 14 hours, the reaction mixture is allowed to cool down to ambient temperature, and filtered through celite. The filtrate is concentrated under reduced pressure below 40° C. and the residue is crystallized from a solution of ethyl acetate/ethanol/water. The dark orange crystals are collected by filtration. The wet product was obtained as an orange solid (800 g, total carotenoid purity 20.4%, total carotenoid yield 85.5%, β-cryptoxanthin purity 9.89%, β-cryptoxanthin yield from anhydrolutein III 62.6%).

Half of the wet product is freeze dried to yield an orange solid (176 g, total carotenoid purity 41.0%, total carotenoid yield 75.6%, β-cryptoxanthin purity 19.2%, β-cryptoxanthin yield from anhydrolutein III 53.4%), which consists of a mixture of a ratio of β-cryptoxanthin:α-cryptoxanthin=3:1. HPLC also shows the presence of minor quantities of unreacted anhydroluteins I and II as well as (3R,3'R)-zeaxanthin.

The other half of the wet product was reslurried in ethanol/water. The orange solid is collected by filtration and dried at 40° C. in a tray dryer. The dry product is obtained as an orange solid (170 g, total carotenoid purity 35.1%, total carotenoid yield 62.5%, β-cryptoxanthin purity 17.3%, β-cryptoxanthin yield from anhydrolutein III 46.6%), which consists of a mixture of a ratio of β-cryptoxanthin:α-cryptoxanthin=3:1. HPLC also shows the presence of minor quantities of unreacted anhydroluteins I and II as well as (3R,3'R)-zeaxanthin. The results of this experiment is summarized in the first last data row of Table 2.

TABLE 2

Large scale hydrogenation of anhydroluteins with platinum (5%) on alumina in ethyl acetate

| Mixture of Anhydroluteins I + II + III | Catalyst Pt (5%) on alumina | EtOAc | Temp. °C., Time (h) | Crude Product (g) % Yield (Total Carotenoids, TC) α-Cryptoxanthin:α-Cryptoxanthin |
|---|---|---|---|---|
| 20 g Total Carotenoid (TC) purity 45% Anhydrolutein III purity 28% | 1.0 g (50 mg, 0.256 mmol) 1.6 mol % ≈ 0.6 Wt % | 700 ml | 40° C., 26 h | 18.3 g TC Yield 86% β:α = 5:1 |
| 20 g TC purity 49% Anhydrolutein III | 1.0 g (50 mg, 0.256 mmol) | 700 ml | 40° C., 21 h | 18.2 g TC Yield 99% β:α = 4:1 |

TABLE 2-continued

Large scale hydrogenation of anhydroluteins with platinum (5%) on alumina in ethyl acetate

| Mixture of Anhydroluteins I + II + III | Catalyst Pt (5%) on alumina | EtOAc | Temp. °C., Time (h) | Crude Product (g) % Yield (Total Carotenoids, TC) α-Cryptoxanthin:α-Cryptoxanthin |
|---|---|---|---|---|
| purity 27% | 1.4 mol % ≈ 0.5 Wt % | | | |
| 20 g TC purity 49% Anhydrolutein III purity 27% | 1.5 g (75 mg, 0.384 mmol) 2.2 mol % ≈ 0.77 Wt % | 700 ml | 40° C., 10 h | 18.2 g TC Yield 94% β:α = 3:1 |
| 400 g TC purity 47.7% Anhydrolutein III purity 31.5% | 40 g | 141 | 40° C., 40 PSI, 14 h | 800 g* TC purity 20.4% TC yield 85.5% β:α = 3:1 |

Total carotenoid purities of the starting materials were determined by UV/Visible spectrophotometry at 476 nm using extinction coefficient (E1%) of 2310 in dichloromethane.
Total carotenoid purities of the products were determined by UV/Visible spectrophotometry at 450 nm using extinction coefficient (E1%) of 2460 in hexane.
TC Yield = (Product Weight * Product TC purity)/(Starting Material Weight * Starting Material TC purity)
*Wet product, before drying In an alternative embodiment, Pd supported on carbon or alumina, Pd supported on calcium carbonate poisoned with lead (Lindlar's catalyst) and Pd supported on polyethyleneimine/silica gel can also be employed to hydrogenate a mixture of anhydroluteins to β-cryptoxanthin and α-cryptoxanthin in low to moderate yields. With the exception of the hydrogenation reaction of anhydroluteins with Pd supported on polyethyleneimine/silica gel that is best carried out at 50° C., the other Pd supported catalysts are quite reactive and effect this transformation at −15° C. However, the regioselectivity of hydrogenation of anhydroluteins with Pd as catalyst is not as good as Pt and this is clearly reflected in the yields of β-cryptoxanthin and α-cryptoxanthin from various experiments summarized in Table 3. These reactions can be carried out under atmospheric or an elevated pressure of hydrogen in a variety of organic solvents in which anhydroluteins are soluble (e.g. ethyl acetate, acetone, tetrahydrofuran (THF), diethyl ether, diisopropyl ether or tert-butyl methyl ether, dichloromethane, 1,2-dichloroethane and chloroform, other ethers, and other chlorinated solvents).

TABLE 3

Hydrogenation of anhydroluteins with supported palladium catalyst at atmospheric pressure of hydrogen in various solvents.

| Mixture of Anhydroluteins I + II + III (75% pure) | Catalyst/Support | Solvent | Temp. °C. Time (h) | β-Cryptoxanthin:α-Cryptoxanthin Yield (%) of Total Carotenoids* |
|---|---|---|---|---|
| 0.3 g, 0.225 g, 0.41 mmol | Pd (5%) on carbon (26 mg ≈ 1.3 mg, 0.012 mmol) 3 mol % ≈ 0.58 Wt % | EtOAc 20 ml | −15° C., 24 h | β:α = 1.2:1 Yield (%) = 46% |
| 0.3 g, 0.225 g, 0.41 mmol | Pd (5%) on carbon (26 mg ≈ 1.3 mg, 0.012 mmol) 3 mol % ≈ 0.58 Wt % | THF 10 ml | −15° C., 24 h | β:α = 1.2:1 Yield (%) = 54% |
| 0.3 g, 0.225 g, 0.41 mmol | Pd (5%) on carbon (26 mg ≈ 1.3 mg, 0.012 mmol) 3 mol % ≈ 0.58 Wt % | $CH_2Cl_2$ 10 ml | −15° C., 24 h | β:α = 1.2:1 Yield (%) = 40% |
| 0.3 g, 0.225 g, 0.41 mmol | Pd (5%) on alumina (12 mg ≈ 0.6 mg, 0.006 mmol) 1.5 mol % ≈ 0.27 Wt % | THF 10 ml | −15° C., 6 h | β:α = 0.96:1 Yield (%) = 37% |
| 0.3 g, 0.225 g, 0.41 mmol | Pd (5%) on $CaCO_3$ Poisoned with led (26 mg ≈ 1.3 mg, 0.012 mmol) 3 mol % ≈ 0.58 Wt % | THF 10 ml | −15° C., 24 h | β:α = 1.0:1 Yield (%) = 20% |
| 0.3 g, 0.225 g, 0.41 mmol | Pd (3%) on polyethyleneimine/$SiO_2$ (Royer Catalyst) (73 mg ≈ 2.19 mg, 0.02 mmol) 5 mol % ≈ 1 Wt % | THF 10 ml | 50° C., 24 h | β:α = 1.2;1 Yield (%) = 40% |
| 0.3 g, 0.225 g, 0.41 mmol | Rh (5%) on alumina (8.5 mg ≈ 0.43 mg, 0.004 mmol) 1 mol % ≈ 0.2 Wt % | Hexane 15 ml | 50° C., 2 h | β:α = 1.2;1 Yield (%) = 30% |

*Yield (%) of total carotenoid refers to the crude mixture of α-cryptoxanthin and β-cryptoxanthin that contains minor quantities of anhydroluteins I and II and (3R,3'R)-zeaxanthin. The carotenoid concentration of this mixture is measured by HPLC as well as UV-visible spectrophotometry using an average extinction coefficient (E1%) of 2511 in hexane.

When Rh supported on alumina is employed in the hydrogenation of anhydroluteins, the reaction is best carried out at 50° C. to give a low yield of β-cryptoxanthin and α-cryptoxanthin and much of the starting material is destroyed under these conditions.

Therefore the present invention relates to a method of hydrogenating a mixture of anhydroluteins I, II, III rich in anhydrolutein III to β-cryptoxanthin and α-cryptoxanthin in the presence of catalytic amount of transition elements of group VIII, preferably Pt supported on alumina, in a variety of organic solvents at temperatures ranging from −15° C. to 100° C., and preferably between about −15° C. and about 50° C., under atmospheric or elevated pressure of hydrogen. In a preferred embodiment, the reaction comprises:

a) dissolving anhydroluteins with purities ranging from 45-75% in an appropriate volume of an organic solvent (≈35 ml/g of anhydroluteins), preferably ethyl acetate, adding catalytic amount of 5% Pt supported on alumina (1.4-2.2 mol % of catalyst to substrate) to obtain a mixture;

b) displacing the air with an inert gas, preferably argon, and then displacing the inert gas with hydrogen;

c) stirring the mixture under an atmospheric pressure of hydrogen between −15° C. to 50° C., preferably at about 40° C., for about 10-26 hours to obtain a mixture of β-cryptoxanthin and α-cryptoxanthin;

d) removing the catalyst by filtration through celite and concentrating the filtrate under reduced pressure below 40° C. to obtain a concentrated residue containing β-cryptoxanthin and α-cryptoxanthin;

e) crystallizing β-cryptoxanthin and α-cryptoxanthin from the residue by adding a 1/1 solution (v/v) of an alcohol in water, preferably, methanol or ethanol in water, collecting the products by filtration, and drying the crystals under high vacuum below 40° C.

4. Homogeneous Catalytic Hydrogenation of Anhydroluteins

The invention relates to a process for hydrogenating a mixture of anhydroluteins to β-cryptoxanthin and α-cryptoxanthin in low to moderate yields in the presence of catalytic amount of several transition metal complexes. The homogeneous catalyst may be transition metal complexes such as palladium acetylacetonate, tris(triphenylphosphine)rhodium (I) chloride [$Rh(Ph_3P)_3Cl$] (Wilkinson's catalyst), (tricyclohexylphosphine)(1,5-cyclooctadiene)pyridine Iridium (I) hexafluorophosphate [$(C_6H_{11})_3P[C_8H_{12}][C_5H_5N]Ir^+PF_6^-$ (Crabtree catalyst), and (1,5-cyclooctadiene)bis(methyldiphenylphosphine) Iridium (I) hexafluorophosphate [$C_8H_{12}][(MePh_2P)_2]Ir^+PF_6^-$. The reactions are all preferably carried out under atmospheric pressure of hydrogen and at ambient temperature. The exception is the hydrogenation reaction involving palladium acetylacetonate that is preferably carried out at 45-50° C. The results of hydrogenation experiments with these homogeneous catalysts are summarized in Table 4.

TABLE 4

Homogeneous catalytic hydrogenation of anhydroluteins at atmospheric pressure of hydrogen in various solvents.

| Mixture of Anhydroluteins I + II + III (75% pure) | Catalyst | Solvent | Temp. Time (h) | β-Cryptoxanthin:α-Cryptoxanthin Unreacted Anhydroluteins* (%) |
|---|---|---|---|---|
| TC Purity 75% 0.3 g, 0.225 g, 0.41 mmol | (MeCOCH:CMeO)$_2$Pd Palladium acetylacetonate (12 mg, 0.04 mmol) 10 mol % | THF, 10 ml | 45-50° C. 15 h | β:α = 1:1.2 % Anhydroluteins = 48 |
| TC Purity 75% 0.3 g, 0.225 g, 0.41 mmol | (Ph$_3$P)$_3$RhCl Chlorotris(triphenylphosphine) Rhodium (I) Wilkinson's Catalyst (56 mg, 0.06 mmol), 15 mol % | THF 10 ml | Ambient, 24 h | β:α = 2:1 % Anhydroluteins = 77 |
| TC Purity 75% 0.3 g, 0.225 g, 0.41 mmol | (Ph$_3$P)$_3$RhCl Chlorotris(triphenylphosphine) Rhodium (I) (56 mg, 0.06 mmol), 15 mol % | CH$_2$Cl$_2$ 10 ml | Ambient, 24 h | β:α = 2.25:1 % Anhydroluteins = 74 |
| TC Purity 75% 0.3 g, 0.225 g, 0.41 mmol | (Ph$_3$P)$_3$RhCl Chlorotris(triphenylphosphine) Rhodium (I) (114 mg, 0.123 mmol), 30 mol % | EtOAc 10 ml | Ambient, 24 h | β:α = 5.3:1 % Anhydroluteins = 30 |
| TC Purity 75% 0.3 g, 0.225 g, 0.41 mmol | (Ph$_3$P)$_3$RhCl Chlorotris(triphenylphosphine) Rhodium (I) (835 mg, 0.902 mmol), Stoichiometric amounts | EtOAc 15 ml | Ambient, 2 h | β:α = 5.25:1 Yield = 96% |
| TC Purity 63% 0.050 g, 0.032 g, 0.058 mmol | (Ph$_3$P)$_3$RhCl Chlorotris(triphenylphosphine) Rhodium (I) 100 mg, 0.11 mmol | EtOAc 2 ml | Ambient, 2 h | β:α = 5.4:1 Yield = 96% |
| 0.3 g, 0.225 g, 0.41 mmol | [Ir(cod)Py(Pcy$_3$)]$^+$PF$_6^-$ Crabtree Catalyst (10 mg, 0.012 mmol) 3 mol % | CH$_2$Cl$_2$ 10 ml | Ambient, 24 h | β:α = 1.4:1 % Anhydroluteins = 42 |
| 0.3 g, 0.225 g, 0.41 mmol | [Ir(cod)(PMePh$_2$)$_2$]$^+$PF$_6^-$ (17 mg, 0.02 mmol) 5 mol % | CH$_2$Cl$_2$ 10 ml | Ambient, 24 h | β:α = 1:5 % Anhydroluteins = 82 |

*The relative ratio (%) of the unreacted anhydroluteins and the products (α-cryptoxanthin, β-cryptoxanthin) is measured by HPLC. The products also contain minor quantities of (3R,3'R)-zeaxanthin.

Among the various homogeneous hydrogenation catalysts attempted, Wilkinson's catalyst [(Ph$_3$P)$_3$RhCl] converts anhydroluteins to β-cryptoxanthin and α-cryptoxanthin in almost quantitative yields. The only regioselective hydrogenation of a highly conjugated polyene system that has been reported in the literature with Wilkinson's catalyst is the hydrogenation of a retinoid derivative, namely, 3,4-didehydro-9-cis-retinoic acid [Bennani, Y. l., Boehm, M. F. J. Org. Chem., 60 (5), 1195-1200, 1995]. However to date, there are no literature reports or examples of regioselective hydrogenation of carotenoids involving the Wilkinson's catalyst or any of the heterogeneous or homogeneous catalysts that have been described in the present invention. The hydrogenation of anhydroluteins with homogeneous catalysts other than Wilkinson's catalyst gives low to moderate yields of β-cryptoxanthin and α-cryptoxanthin and substantial amounts of anhydrolutein remains unreacted.

Therefore the present invention further relates to a method of hydrogenating a mixture of anhydroluteins I, II, III rich in anhydrolutein III to β-cryptoxanthin and α-cryptoxanthin in the presence of catalytic amount of transition metal complexes, preferably Wilkinson's catalyst [(Ph$_3$P)$_3$RhCl] in a variety of organic solvents at ambient temperature under atmospheric pressure of hydrogen. In a preferred embodiment, the reaction comprises:

a) dissolving anhydroluteins with purities ranging from 45-75% in an appropriate volume of an organic solvent (≈50 ml/g of anhydroluteins), preferably ethyl acetate, adding stoichiometric amount of (Ph$_3$P)$_3$RhCl (2.2 mol equivalent of catalyst to substrate) to obtain a mixture;

b) displacing the air with an inert gas, preferably argon, and then displacing the inert gas with hydrogen;

c) stirring the mixture under an atmospheric pressure of hydrogen at ambient temperature for about 2 hours to obtain a mixture of β-cryptoxanthin and α-cryptoxanthin;

d) removing the catalyst by filtration through celite and concentrating the filtrate under reduced pressure below 40° C. to obtain a concentrated residue containing β-cryptoxanthin and α-cryptoxanthin;

e) crystallizing β-cryptoxanthin and α-cryptoxanthin from the residue by adding a 1/1 solution (v/v) of an alcohol in water, preferably, methanol or ethanol in water, collecting the products by filtration, and drying the crystals under high vacuum below 40° C.

It will be readily apparent to one of ordinary skill in the relevant arts that other suitable modifications and adaptations to the methods and applications described herein are obvious and may be made without departing from the scope of the invention or any embodiment thereof. Having now described the present invention in detail, the same will be more clearly understood by reference to the following examples, which are included herewith for purposes of illustration only and are not intended to be limiting of the invention.

5. Preparation of Anhydroluteins I, II, III from Lutein and Lutein Esters

Example A

Conversion of (3R,3'R,6'R)-Lutein (85% pure) to Anhydroluteins I, II, and III With Hydrochloric Acid in N-Propanol and Tetrahydrofuran (THF)

(3R,3'R,6'R)-Lutein (6.0 g of 85% lutein content ≈5.10 g, 8.98 mmol) is placed in a 500 ml three-neck flask equipped with a reflux condenser and a thermometer. The flask is charged with 100 ml of n-propanol and 10 ml of tetrahydrofuran (THF) followed by 1 ml of 10% hydrochloric acid in n-propanol (v/v) [prepared from 0.1 ml of concentrated HCl+ 0.9 ml of n-propanol]. The flask is immersed in an oil bath and the mixture is heated to about 45-50° C. under a stream of nitrogen. The temperature should not exceed 55° C. At first lutein is insoluble in n-propanol but once the temperature reaches 45-50° C., a dark red uniform solution is obtained. After 30 minutes to one hour from the time that the reaction temperature reaches 45-50° C., lutein is completely converted to lutein 3'-propyl ether.

100 ml of water is added to the reaction mixture to obtain a suspension of lutein 3'-propyl ether as yellowish orange crystals and the oil-bath temperature is increased so that the temperature of the reaction mixture reaches 90° C. As the reaction temperature approaches the boiling point of THF (65-67° C.), this solvent is distilled off. Once all the THF is removed 8.0 ml of 18-19% hydrochloric acid in water (v/v) [prepared from 4 ml of concentrated HCl (36.5-38%)+4 ml of water] is added and the temperature of the mixture is raised to 90° C. (reflux temperature). As the temperature is increased above 60° C., lutein 3'-propyl ether gradually converts to anhydroluteins I, II, and III. However, anhydrolutein I is the major product at this time. At 90° C., anhydroluteins I is gradually converted to anhydrolutein III. Anhydrolutein II remains steady. After 12-17 h at 90° C., the oil bath is removed and the mixture is allowed to cool down to room temperature. 20 ml of 10% sodium hydroxide in water (wt/v) is added and stirring at room temperature is continued for 10 minutes. The reddish crystals of anhydroluteins are then removed by vacuum filtration on a Buchner funnel. The crystalline product is sequentially washed with 40 ml of a 1/1 solution of ethanol/water (v/v) followed by 30 ml of ethanol and 10 ml of hexanes. This gives 5.0 g of red crystals of anhydrolutein that is quite dry at this point. Additional drying under high vacuum for 5 h gives 4.5 g of product (≈75% total carotenoids by UV-visible spectrophotometry). The product consists of all-trans-zeaxanthin (minor amounts), an approximate ratios of anhydrolutein I: anhydrolutein anhydrolutein III (1.4:1.0:10). The filtrate from the above reaction contains minor quantities of cis(Z)-carotenoids and is shown to have a pH of 7.

Example B

Conversion of Wet (3R,3'R,6'R)-Lutein (38% pure) to Anhydroluteins I, II, and III with Hydrochloric Acid in n-Propanol A suspension of lutein wet cake (40.0 g, 38% ≈15.2 g, 26.8 mmol) in 1-propanol (100 ml) and water (50 ml) is mechanically stirred at 400 rpm in a 1000 ml four-neck flask, equipped with a condenser, a mechanical stirrer, a thermometer, and a nitrogen inlet. An aqueous solution of hydrochloric acid (10.0 ml, 6.0 N, 5.0 ml of concentrated hydrochloric acid+5.0 ml of water) is added and the reaction mixture is heated at reflux under an atmosphere of nitrogen. The course of the reaction is monitored by HPLC. After 16 h, the reaction mixture is allowed to cool down to room temperature, diluted with water (100 ml), and neutralized by 24 ml of 2.5 N aqueous sodium hydroxide solution. The red crystals are collected by filtration and washed sequentially with 500 ml of water and 20 ml of cold ethanol, and dried under high vacuum to give 18.5 g of product (13.7 g total carotenoids, 74% purity as determined by UV/Visible spectrophotometry). Anhydroluteins are obtained in yield from lutein of 63% in the ratio of: anhydrolutein I:anhydrolutein II:anhydrolutein III=1.9:1.0:10.9.

Example C

Direct Conversion of Lutein Esters to Anhydroluteins I, II, and III by Acid-Catalyzed Transesterification Marigold oleoresin (5 g) containing lutein esters (from Kemin Foods, Des Moines, Iowa) is dissolved in hexane (10 ml) and is treated with n-propanol (6 ml) and 0.5 ml of 10% hydrochloric acid in propanol (v/v). The mixture is heated at 60° C. and the course of the reaction is followed by HPLC (Khachik & Beecher, J. Chromatogr. 449: 119-133, 1988). After 8 h, carotenol fatty acid esters are converted to a mixture of lutein 3-myristate 3'-propyl ether, lutein 3-palmitate 3'-propyl ether, as well as myristic and palmitic esters of anhydroluteins I, II, and III.

Water (6 ml) and 0.5 ml of aqueous HCl (18-19%, v/v) is added and the temperature of the reaction mixture is gradually raised to distill off the hexane. After removal of hexane, the temperature is raised to 90° C. and the mixture is refluxed in n-propanol for 22 h. The reaction mixture is allowed to cool down to ambient temperature and the acid is neutralized with an aqueous solution of NaOH (10%). The product is extracted with tert-butyl methyl ether (10 ml) and the aqueous layer is removed. The organic layer is treated with 10 ml of methanolic KOH (10%) and stirred at ambient temperature for 2 h. The saponified product is washed with water (3×10 ml), dried over sodium sulfate, and most of the solvents are evaporated. The residue is crystallized from a 1/1 solution of ethanol/water (v/v) to give 238 mg of red crystals that is shown by HPLC to be 60% total carotenoids (142.8 mg) of which mostly contains anhydroluteins I-III as well as minor quantities of (3R,3'R)-zeaxanthin.

Example D

Conversion of Lutein Esters to Anhydroluteins I, II, and III via Lutein 3'-Alkyl Ether Marigold oleoresin (5 g) containing lutein esters (from Kemin Foods) is dissolved in hexane (10 ml) and is treated with n-propanol (6 ml) and 0.5 ml of 10% hydrochloric acid in propanol (v/v). The mixture is heated at 45-50° C. and the course of the reaction is followed by HPLC. After 21 h, the reaction mixture is allowed to cool down to ambient temperature; 10 ml of methanolic KOH (10%) is added and stirring is continued at ambient temperature for 2 h. The saponified product is washed with water (3×10 ml), dried over sodium sulfate, and most of the solvents are evaporated. The residue is crystallized from a 1/1 solution of ethanol/water (v/v) to give 263 mg of orange crystals that is shown by HPLC to be 60% pure lutein 3'-propyl ether (157.8 mg) as well as minor quantities of (3R,3'R)-zeaxanthin. The crystalline product is suspended in n-propanol (3 ml) and water (3 ml) and is treated with 0.2 ml of 18-19% hydrochloric acid in water (v/v). The mixture is heated to 90° C. (reflux temperature) and the course of the reaction is followed by HPLC (Khachik et al. J. Chromatogr. Biomed. Application, 670: 219-233, 1995). After 18 h, the mixture is allowed to cool down to room temperature. 0.6 ml of 10% sodium hydroxide in water (wt/v) is added and stirring at room temperature is continued for 10 minutes. The product is extracted with 10 ml of tert-butyl methyl ether and the aqueous layer is removed. The organic phase is washed with water (3×10 ml), dried over sodium sulfate, and most of the solvents are evaporated. The residue is crystallized with a 1/1 solution of ethanol/water (v/v). After drying under high vacuum, 236 mg of reddish crystals (≈60% total carotenoids by UV-visible spectrophotometry) are obtained. This is shown by HPLC to consist of all-trans-zeaxanthin (minor amounts), and anhydroluteins in the approximate ratios of anhydrolutein I: anhydrolutein II: anhydrolutein III (1.5:1.0:7.5).

6. Heterogeneous Catalytic Hydrogenation Reactions of Anhydroluteins I, II, III

Example A

Catalytic Hydrogenation of Anhydroluteins I, II, III (75% Total Carotenoids) with Platinum (5%) Supported on Alumina in Ethyl Acetate at −5° C.

To a mixture of 75% total carotenoids (0.3 g≈0.225 g) and platinum (5%) supported on alumina (80 mg≈4.0 mg Pt) in a 60 ml glass reaction tube is added 20 ml of ethyl acetate and the tube is cooled down to −5° C. to 0° C. in an ice/salt bath. The tube is evacuated and filled with hydrogen several times, and then sealed. The mixture is stirred at −5 to 0° C. and the course of the reaction is followed by HPLC. After nearly 4 h, HPLC shows nearly the complete conversion of anhydroluteins to the desired products. Approximately 30 ml of hydrogen (1.34 mmol) is required to complete the reaction. The product is allowed to warm up to ambient temperature and filtered through celite to remove the catalyst. At this point, the total carotenoids yield is 89% as measured by UV-Vis spectrophotometry in hexane at 448 nm using an average extinction coefficient for α-cryptoxanthin and β-cryptoxanthin (E1%=2511); this is also confirmed by HPLC. The filtrate is concentrated under reduced pressure below 40° C. and the residue is crystallized from 10 ml of a 1/1 solution of ethanol/water. The dark orange crystals are collected by filtration, washed with 5 ml of cold ethanol, and dried under high vacuum below 40° C. According to HPLC, the product (0.24 g, total carotenoids yield 70%) consists of a mixture of β-cryptoxanthin and α-cryptoxanthin in the ratio of 3:1. HPLC also shows the presence of minor quantities of unreacted anhydroluteins I and II as well as (3R,3'R)-zeaxanthin.

Example B

Catalytic Hydrogenation of Anhydroluteins I, II, III (75% Total Carotenoids) with Platinum (5%) Supported on Alumina in Ethyl Acetate at −15° C.

To a mixture of 75% total carotenoids (0.3 g≈0.225 g) and platinum (5%) supported on alumina (80 mg≈4.0 mg Pt) in a 60 ml glass reaction tube is added 20 ml of ethyl acetate and the tube is cooled down to −15° C. in a low temperature freezer. The tube is evacuated and filled with hydrogen several times, and then sealed. The mixture is stirred at −15° C. and the course of the reaction is followed by HPLC. After nearly 24 h, HPLC shows nearly the complete conversion of anhydroluteins to the desired products. The product is allowed to warm up to ambient temperature and is filtered through celite to remove the catalyst. At this point, the total carotenoids yield is 90% as measured by UV-Vis spectrophotometry in hexane at 448 nm using an average extinction coefficient for α-cryptoxanthin and β-cryptoxanthin (E1%=2511). The filtrate is concentrated under reduced pressure below 40° C. and the residue is crystallized from 10 ml of a 1/1 solution of ethanol/water. The dark orange crystals are collected by filtration, washed with 5 ml of cold ethanol, and dried under high vacuum below 40° C. According to HPLC, the product (0.29 g, total carotenoids yield 70%) consists of a mixture cryptoxanthins in the ratio of β-cryptoxanthin:α-cryptoxanthin=7:3. HPLC also shows the presence of minor quantities of unreacted anhydroluteins I and II as well as (3R,3'R)-zeaxanthin.

Example C

Catalytic Hydrogenation of Anhydroluteins I, II, III (45% Total Carotenoids) with Platinum (5%) Supported on Alumina in Ethyl Acetate at 40° C.

A three-neck round bottom flask is equipped with a mechanical stirrer, a thermometer, and a gas inlet. The flask is charged with a mixture of anhydroluteins (20.0 g, 45% total carotenoids, 28% anhydrolutein III), platinum (5%) supported on alumina (1.0 g,), and ethyl acetate (700 ml). The air is displaced with argon and the mixture was heated to 40° C. with mechanical stirring at 500 rpm. Hydrogen is bubbled into the solution and the mixture is stirred at 40° C. After 26 hours, the reaction mixture is allowed to cool down to ambient temperature, diluted with 200 ml of ethyl acetate, and filtered through celite. The filtrate is concentrated under reduced pressure below 40° C. and the residue is crystallized from a solution of ethyl acetate/ethanol/water. The dark orange crystals are collected by filtration, and dried under high vacuum below 40° C. The product is obtained as a red solid (18.3 g, total carotenoid yield 86%, β-cryptoxanthin yield from anhydrolutein III is 48%) and consists mainly of a mixture of cryptoxanthins in the ratio of: β-cryptoxanthin:α-cryptoxanthin=5:1. HPLC also shows the presence of minor quantities of unreacted anhydroluteins I and II as well as (3R,3'R)-zeaxanthin.

Example D

Catalytic Hydrogenation of Anhydroluteins I, II, III (49% Total Carotenoids) with Platinum (5%) Supported on Alumina in Ethyl Acetate at 40° C.

A three-neck round bottom flask is equipped with a mechanical stirrer, a thermometer, and a gas inlet. The flask is charged with a mixture of anhydroluteins (20.0 g, 49% total carotenoids, 27% anhydrolutein III), platinum (5%) supported on alumina (1.0 g), and ethyl acetate (700 ml). The air is displaced with argon and the mixture is heated to 40° C. with mechanical stirring at 500 rpm. Hydrogen is bubbled into the solution and the mixture is stirred at 40° C. After 21 hours, the reaction mixture is allowed to cool down to ambient temperature, diluted with 200 ml of ethyl acetate, and filtered through celite. The filtrate is concentrated under reduced pressure below 40° C. and the residue is crystallized from a solution of ethyl acetate/ethanol/water. The dark orange crystals are collected by filtration, and dried under high vacuum below 40° C. The product is obtained as a red solid (18.2 g, total carotenoid yield 99%, β-cryptoxanthin yield from anhydrolutein III is 61%) and consists mainly of a mixture of cryptoxanthins in the ratio of β-cryptoxanthin:α-cryptoxanthin=4:1. HPLC also shows the presence of minor quantities of unreacted anhydroluteins I and II as well as (3R,3'R)-zeaxanthin.

Example E

Catalytic Hydrogenation of Anhydroluteins I, II, III (49% Total Carotenoids) with Platinum (5%) Supported on Alumina in Ethyl Acetate at 40° C.

A three-neck round bottom flask is equipped with a mechanical stirrer, a thermometer, and a gas inlet. The flask is charged with a mixture of anhydroluteins (20.0 g, 49% total carotenoids, 27% anhydrolutein III), platinum (5%) supported on alumina (1.5 g), and ethyl acetate (700 ml). The air is displaced with argon and the mixture is heated to 40° C. with mechanical stirring at 500 rpm. Hydrogen is bubbled into the solution and the mixture is stirred at 40° C. After 10 hours, the reaction mixture is allowed to cool down to ambient temperature, diluted with 200 ml of ethyl acetate, and filtered through celite. The filtrate is concentrated under reduced pressure below 40° C. and the residue is crystallized from a solution of ethyl acetate/ethanol/water. The dark orange crystals are collected by filtration, and dried under high vacuum below 40° C. The product is obtained as a red solid (18.2 g, total carotenoid yield 94%, β-cryptoxanthin yield from anhydrolutein III is 75%) and consists of a mixture of cryptoxanthins in the ratio of β-cryptoxanthin:α-cryptoxanthin=3:1. HPLC also shows the presence of minor quantities of unreacted anhydroluteins I and II as well as (3R,3'R)-zeaxanthin.

Example F

Catalytic Hydrogenation of Anhydroluteins I, II, III (75% Total Carotenoids) with Palladium (5%) Supported on Carbon in Ethyl Acetate at −15° C.

To a mixture of 75% total carotenoids (0.3 g≈0.225 g) and palladium (5%) supported on carbon (26 mg≈1.3 mg Pd) in a 60 ml glass reaction tube is added 20 ml of ethyl acetate and the mixture is cooled down to −15° C. in a low temperature freezer. The tube is evacuated and filled with hydrogen several times and then sealed. The mixture is stirred at −15° C. and the course of the reaction is followed by HPLC. After nearly 24 h, HPLC shows nearly the complete conversion of anhydroluteins to the desired products. The product is allowed to warm up to ambient temperature and is filtered through celite to remove the catalyst. The filtrate is concentrated under reduced pressure below 40° C. and the residue is crystallized from 10 ml of a 1/1 solution of ethanol/water. The dark orange crystals are collected by filtration, washed with 5 ml of cold ethanol, and dried under high vacuum below 40° C. According to HPLC, the product (0.22 g, total carotenoids yield 46%, 0.103 g) consists of a mixture of cryptoxanthins in the ratio of β-cryptoxanthin:α-cryptoxanthin=1:1. HPLC also shows the presence of minor quantities of unreacted anhydroluteins. I and II as well as (3R,3'R)-zeaxanthin.

7. Homogeneous Catalytic Hydrogenation Reactions of Anhydroluteins I, II, III

Example A

Catalytic Hydrogenation of Anhydroluteins I. II, III (75% Total Carotenoids) with Palladium Acetylacetonate in Tetrahydrofuran (THF) at 45-50° C.

To a mixture of 75% total carotenoids (0.3 g≈0.225 g) and palladium acetylacetonate (12 mg) in a 40 ml glass reaction tube is added 10 ml of THF and the mixture is cooled down to 0° C. in an ice bath. The tube is evacuated and filled with hydrogen several times and then sealed. The ice bath is removed and the mixture is stirred at 45-50° C. The progress of the reaction is monitored by HPLC. After nearly 15 h, HPLC shows that no additional amounts of β-cryptoxanthin and α-cryptoxanthin can be formed while considerable amounts of anhydroluteins remain unreacted. The product is allowed to cool down to ambient temperature and is filtered through celite to remove the catalyst. The solids are washed with THF (5 ml), and the filtrate is concentrated under reduced pressure below 40° C. The concentrated residue is crystallized from 10 ml of a 1/1 solution of ethanol/water. The dark orange crystals are collected by filtration, washed with 5 ml of cold ethanol, and dried under high vacuum below 40° C. According to HPLC, the product (0.28 g, ≈60% total carotenoids) consists of a mixture of cryptoxanthins in the ratio of β-cryptoxanthin:α-cryptoxanthin=1:1.5 and unreacted anhydroluteins (48%). HPLC also shows the presence of minor quantities of (3R,3'R)-zeaxanthin.

Example B

Catalytic Hydrogenation of Anhydroluteins I, II, III (75% Total Carotenoids) with Chlorotris(triphenylphosphine)Rhodium(I) in Ethyl Acetate at Ambient Temperature To a mixture of 75% total carotenoids (0.3 g≈0.225 g) and $(Ph_3P)_3RhCl$ (835 mg) in a 40 ml glass reaction tube is added 15 ml of ethyl acetate and the mixture is cooled down to 0° C. in an ice bath. The tube is evacuated and the solution is degassed under nitrogen. The tube is then evacuated and filled with hydrogen several times and sealed. The mixture is stirred at ambient temperature and the course of the reaction is followed by HPLC. After 2 h, HPLC shows the complete conversion of anhydroluteins to the desired products. The product is filtered through celite to remove the catalyst and the solids are washed with ethyl acetate. At this point, the total carotenoid yield is 96% as measured by UV-Visible spectrophotometry in hexane at 448 nm using an average extinction coefficient for α-cryptoxanthin and β-cryptoxanthin (E1%=2511). The filtrate is concentrated under reduced pressure below 40° C. and the residue is crystallized from 10 ml of a 1/1 solution of ethanol/water. The dark orange crystals are collected by filtration, washed with 5 ml of cold ethanol, and dried under high vacuum below 40° C. According to HPLC, the product (0.29 g, total carotenoids purity 74%, 0.215 g) consists of a mixture of cryptoxanthins in the ratio of β-cryptoxanthin:α-cryptoxanthin=5.25:1. HPLC also shows the presence of minor quantities of (3R,3'R)-zeaxanthin.

Example C

Catalytic Hydrogenation of Anhydroluteins I, II, III (63% total carotenoids, 45% Anhydrolutein III) with Chlorotris(triphenylphosphine)Rhodium(I) in Ethyl Acetate at Ambient Temperature A suspension of Wilkinson's catalyst (100 mg, 0.11 mmol) in 2 ml of ethyl acetate ispurged by hydrogen and then magnetically stirred under hydrogen at room temperature for 2 hours. To the reaction mixture is added 50 mg of crude anhydroluteins (anhydrolutein III, 45%, 0.041 mmol). The mixture is stirred under hydrogen administered through a hydrogen balloon. After 2 hours, HPLC indicated complete consumption of anhydroluteins. The mixture is microfiltered and the filter is washed with 2 ml of ethyl acetate. The solvent is evaporated under nitrogen and the residue is dried under high vacuum for 2 h. The product is obtained as a red solid (90 mg) and consists of a mixture of cryptoxanthins in the ratio of: β-cryptoxanthin:α-cryptoxanthin=5.4:1. The yield of β-cryptoxanthin based on anhydrolutein III is 96%.

Example D

Catalytic Hydrogenation of Anhydroluteins I, IL III (75% total carotenoids) with $[Ir(cod)Py(Pcy_3)]^+PF_6^-$ (Crabtree Catalyst) in Dichloromethane at Ambient Temperature To a mixture of anhydroluteins (75% total carotenoids, 0.3 g≈0.225 g) and $[Ir(cod)Py(Pcy_3)]^+PF_6^-$ (10 mg) in a 40 ml glass reaction tube is added 10 ml of dichloromethane and the mixture is cooled down to 0° C. in an ice bath. The tube is evacuated and the solution is degassed under nitrogen. The tube is then evacuated and filled with hydrogen several times and sealed. The mixture is stirred at ambient temperature and the course of the reaction is followed by HPLC. After 24 h, HPLC shows that no additional amounts of β-cryptoxanthin and α-cryptoxanthin can be formed while considerable amounts of anhydroluteins remain unreacted. The product is filtered through celite and most of the solvent is evaporated under reduced pressure. The concentrated residue is crystallized from 10 ml of a 1/1 solution of ethanol/water. The dark orange crystals are collected by filtration and dried under high vacuum below 40° C. According to HPLC, the product (0.26 g, ≈60% total carotenoids) consists of a mixture of cryptoxanthins (β-cryptoxanthin:α-cryptoxanthin=1.4:1) and unreacted anhydroluteins (42%). HPLC also shows the presence of minor quantities of (3R,3'R)-zeaxanthin.

Having now fully described this invention, it will be understood by those of ordinary skill in the art that the same can be performed within a wide and equivalent range of conditions, formulations and other parameters without affecting the scope of the invention or any embodiment thereof. All patents, patent applications and publications cited herein are fully incorporated by reference in their entirety.

What is claimed:

1. A process for converting a mixture of anhydroluteins I, II, and III, rich in anhydrolutein III, into β- and α-cryptoxanthin, comprising reacting said anhydroluteins I, II and III with hydrogen in the presence of a Group VIII transition element catalyst in an organic solvent at a temperature not exceeding 100° C. to yield said mixture of β- and α-cryptoxanthin.

2. The method of claim 1, wherein the β-cryptoxanthin is (3R)-β-cryptoxathin and the α-cryptoxanthin is (3R,6'R)-α-cryptoxanthin.

3. The method of claim 1, wherein the temperature is between about −15° C. and about 80° C.

4. A process for converting a mixture of anhydroluteins to β-cryptoxanthin and α-cryptoxanthin by heterogeneous catalytic hydrogenation, comprising reacting the anhydroluteins with hydrogen in the presence of a catalyst selected from transition elements of group VIII in an organic solvent to obtain a mixture of β-cryptoxanthin as the major product and α-cryptoxanthin as the minor product.

5. The process of claim 4, wherein said mixture of anhydroluteins is rich in anhydrolutein III.

6. The process of claim 4, wherein said mixture of anhydroluteins is prepared from lutein esters via lutein 3-acylesters 3'-alkyl ether or lutein 3'-alkyl ether.

7. The process of claim 4, wherein said organic solvent is selected from the group consisting of ethyl acetate, acetone, tetrahydrofuran (THF), diethyl ether, diisopropyl ether or tert-butyl methyl ether, dichloromethane, 1,2-dichloroethane and chloroform, or their combination.

8. A process for preparing a composition of matter comprising β- and α-cryptoxanthin, comprising a) reacting lutein, lutein esters, or combinations thereof in alcohol with a catalytic amount of acid at an elevated temperature to yield a mixture of anhydroluteins, and b) reacting the anhydroluteins with hydrogen in the presence of a Group VIII transition element catalyst in an organic solvent at a temperature not exceeding 70° C. to yield a mixture of β-cryptoxanthin to α-cryptoxanthin in a ratio of least 4:1.

9. A process for preparing a composition of matter comprising β- and α-cryptoxanthin, comprising reacting a mixture of anhydroluteins with hydrogen in the presence of a catalyst selected from transition elements of group VIII in an organic solvent to yield a mixture of β-cryptoxanthin and α-cryptoxanthin in a ratio of least 4:1.

10. A process for preparing a composition of matter comprising β- and α-cryptoxanthin, comprising reacting a mixture of anhydroluteins containing minor quantities of zeaxanthin with hydrogen in the presence of a catalyst selected from transition metal complexes in an organic solvent at temperatures less than about 60° C. to yield a mixture of β-cryptoxanthin and α-cryptoxanthin in a ratio of least 4:1.

11. A process for preparing a composition of matter comprising β- and α-cryptoxanthin, comprising a) converting lutein, lutein esters, or combinations thereof to a mixture of anhydroluteins using acid-catalysis, and b) converting the anhydroluteins to β- and α-cryptoxanthin using catalytic hydrogenation to yield a mixture of β-cryptoxanthin and α-cryptoxanthin in a ratio of least 4:1.

12. The process of claim 8, 9, 10 or 11, wherein said mixture of anhydroluteins is a mixture of anhydroluteins I, II, and III and said mixture of anhydroluteins I, II, and III is rich in anhydrolutein III.

13. The process of claim 10, wherein said organic solvent is ethyl acetate, tetrahydrofuran (THF), diethyl ether, diisopropyl ether, tert-butyl methyl ether, dichloromethane, 1,2-dichloroethane, or combinations thereof.

* * * * *